March 2, 1937.  O. C. REEVES  2,072,649
SCALE BEARING
Filed Sept. 1, 1934
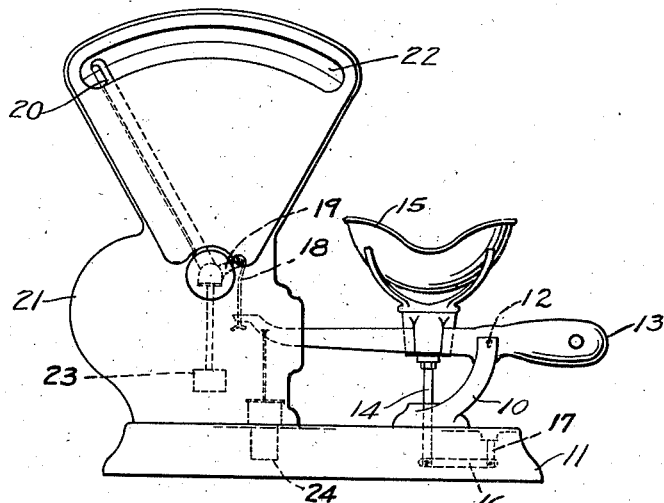
Fig-I
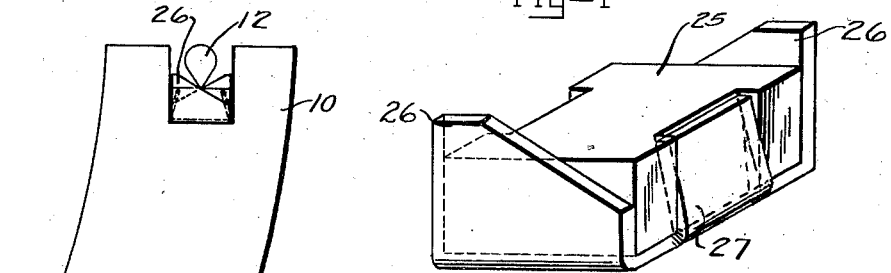
Fig-II  Fig-III
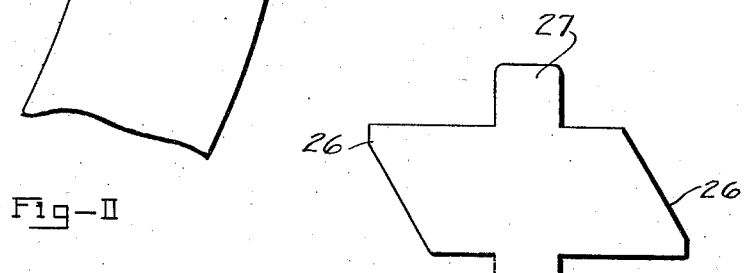
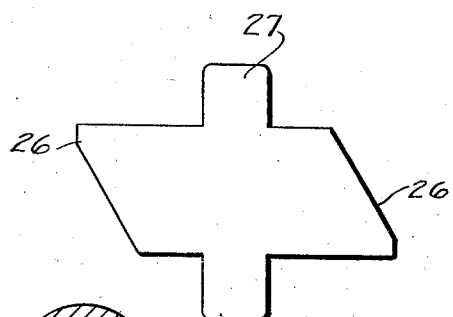
Fig-IV
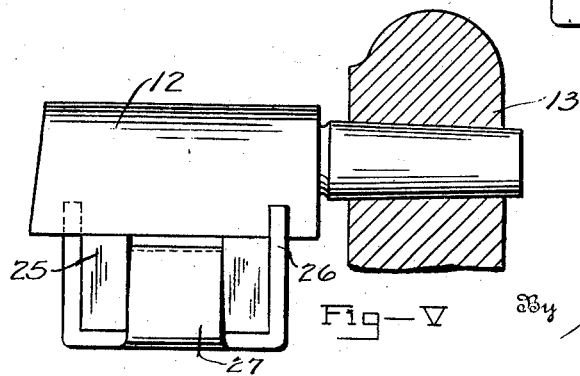
Fig-V
Orwell C. Reeves
Inventor
By C. C. Marshall
Attorney Patented Mar. 2, 1937

2,072,649

UNITED STATES PATENT OFFICE 2,072,649

SCALE BEARING

Orwell C. Reeves, Dayton, Ohio, assignor to Toledo Scale Manufacturing Company, Toledo, Ohio, a corporation of New Jersey Application September 1, 1934, Serial No. 742,467

2 Claims. (Cl. 308—2)

In order to ensure accurate operation of weighing scales and other instruments having knife-edge pivots, it is desirable to eliminate all danger of binding of the pivots in their bearings, and of displacement, however slight, of the pivots from their proper positions.

The principal object of this invention is to provide an easily made pivot bearing that holds the pivot properly seated, with a minimum of friction. More specific objects and advantages are apparent from the description, in which reference is had to the accompanying drawing illustrating a preferred embodiment of the invention.

Figure I of the drawing is a front elevation of a weighing scale equipped with a pivot bearing made in accordance with the invention.

Figure II is a diagram showing the manner in which the pivot bearing is held in the fulcrum stand of the scale and the manner in which it supports the pivot.

Figure III is an enlarged perspective view of the pivot bearing.

Figure IV is a plan view of the metal plate stamped out flat and ready to be folded about the block.

Figure V is a fragmentary vertical section of a weighing scale showing the pivot bearing supporting a knife-edge pivot.

But this specific drawing and the specific description that follows are to disclose and illustrate the invention and not to impose limitations upon the claims.

Although the pivot bearing is useful in any instrument having knife-edge pivots, it is here shown mounted in a fulcrum stand 10 rising from the base casing 11 of a weighing scale, where it supports the knife-edge fulcrum pivot 12 of a counterweighted lever 13. The lever in turn supports a spider 14 carrying the scale pan 15. At its lower end the spider is held against tipping by a link 16 connected to a bracket 17 that is fixed to the base casing. The nose of the lever 13 is hung by a rod 18 from a short arm 19 that extends outward from the lower end of an indicating hand 20.

Since the lower end of the indicating hand is mounted on a pivot (not shown) in a housing 21 resting on the base casing, it is free to swing along a chart 22 in the upper part of the housing, which is marked with weight graduations. Also secured to the lower end of the indicating hand is a pendulum 23 that swings upward when the short arm 19 is drawn downward by the lever, to counterbalance material in the pan. The lever 13 is connected to a dashpot 24 in the base casing, to prevent the indicating hand from making too many oscillations before it comes to rest in front of the proper weight indication on the chart.

In the manufacture of the pivot bearing a smooth pivot seat is cut on a block 25 of hard material such as agate or hardened steel. The pivot seat has a smooth surface that is either planar or slightly cylindrical, as distinguished from the usual V-shaped seat. A planar surface, which is more easily produced, is preferable. In order to hold the knife-edge pivot from lateral displacement on the seat, stops 26 are provided to contact the pivot on two sides. They preferably have oppositely inclined surfaces so that they contact only the sharp edge of the pivot, as shown in Figure II.

Although the stops may be cut out of the same block as the seat or made in any other manner, they are more conveniently formed by the upturned ends of a plate of sheet metal secured to the underside of the block. Tongue fasteners 27 may be formed on the plate when it is punched out, to be crimped into recesses provided on the sides or ends of the block for securing the plate to the block.

The inclined surfaces of the stops and the smooth surface of the seat afford no groove or angle wherein dirt may accumulate. Since the hard surface remains clean, the knife-edge always rests firmly down on the bearing, and no lateral play between the stops is possible. Binding cannot occur at the inclined stops because the knife-edge rests not on the stops but on the seat, and is only laterally restrained by the stops. If the edge of the pivot becomes slightly rounded, there is still only a line contact between the pivot and seat.

Changes in form may be made and other embodiments of the substance of the invention may be constructed to meet various conditions.

Having described my invention, I claim:

1. In a weighing scale, in combination, a block having a substantially horizontal upper surface, a knife-edged pivot resting on said surface, and a sheet metal member folded about said block and having upturned sides with edges sloping in opposite directions which engage said pivot at a single place on each side thereof.

2. In a device of the class described, in combination, a bearing block having a plane surface, a knife edge pivot having its knife edge engaged with the plane surface of said bearing block, a single stop having a surface sloping upwardly and away from the knife edge of said pivot at one end of the plane surface of said bearing block, and another single stop having a surface sloping upwardly and away from the knife edge of said pivot at the other end of the plane surface of said bearing block, the said stops being on opposite sides of said knife edge pivot and spaced longitudinally of said pivot to permit said pivot to adjust its position on said bearing block sufficiently to insure rolling engagement of its edge with the plane surface of said bearing block after its edge becomes rounded.

ORWELL C. REEVES.